United States Patent
Binzer et al.

(10) Patent No.: US 12,072,439 B2
(45) Date of Patent: Aug. 27, 2024

(54) SYNTHETIC GENERATION OF RADAR, LIDAR AND ULTRASOUND MEASUREMENT DATA

(71) Applicant: Robert Bosch GmbH, Stuttgart (DE)

(72) Inventors: Thomas Binzer, Ingersheim (DE); Anna Khoreva, Stuttgart (DE); Juergen Hasch, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 929 days.

(21) Appl. No.: 17/077,947

(22) Filed: Oct. 22, 2020

(65) Prior Publication Data

US 2021/0132189 A1 May 6, 2021

(30) Foreign Application Priority Data

Nov. 4, 2019 (DE) .......................... 102019216927.9

(51) Int. Cl.
*G01S 7/40* (2006.01)
*G01S 7/41* (2006.01)

(52) U.S. Cl.
CPC ............ *G01S 7/4052* (2013.01); *G01S 7/412* (2013.01); *G01S 7/417* (2013.01)

(58) Field of Classification Search
CPC ........ G01S 7/4052; G01S 7/412; G01S 7/417; G06V 10/94
See application file for complete search history.

(56) References Cited

U.S. PATENT DOCUMENTS

| 10,176,388 B1 * | 1/2019 | Ghafarianzadeh ..... G06V 10/94 |
| 2017/0160425 A1 * | 6/2017 | Miles ................... G01V 99/005 |

(Continued)

FOREIGN PATENT DOCUMENTS

| DE | 102018204494 B3 | 8/2019 | |
| GB | 2468921 A * | 9/2010 | ............... G01V 7/00 |
| WO | 2018224690 A1 | 12/2018 | |

OTHER PUBLICATIONS

Wang, "Synthetic Aperture Radar Image Generation With Deep Generative Models", IEEE Geoscience and Remote Sensing Letters. vol. 16, No. 6 pp. 912-916 (Year: 1992).*

(Continued)

*Primary Examiner* — Michael J Dalbo
*Assistant Examiner* — Kaleria Knox
(74) *Attorney, Agent, or Firm* — NORTON ROSE FULBRIGHT US LLP; Gerard A. Messina (57) ABSTRACT

A method for generating synthetic measurement data indistinguishable from actual measurement data captured by a first physical measurement modality. The first physical measurement modality is based on emitting an interrogating wave towards an object and recording a reflected wave coming from the object in a manner that allows for a determination of the time-of-flight between the emission of the interrogating beam and the arrival of the reflected wave. The method includes: obtaining a first compressed representation of the synthetic measurement data in a first latent space, wherein this first latent space is associated with a first decoder that is trained to map each element of the first latent space to a record of synthetic measurement data that is indistinguishable from records of actual measurement data of the first physical measurement modality, and applying the first decoder to the first compressed representation, so as to obtain the sought synthetic measurement data.

13 Claims, 3 Drawing Sheets

(56) References Cited

U.S. PATENT DOCUMENTS

2017/0161635 A1* 6/2017 Oono .................... G06N 3/084
2017/0372193 A1* 12/2017 Mailhe ................... G06T 5/005
2019/0385025 A1* 12/2019 McMichael ............ G06V 10/82
2020/0160105 A1* 5/2020 Kehl ..................... G06F 18/214
2020/0184316 A1* 6/2020 Kavukcuoglu ..... H03M 7/3082
2020/0327440 A1* 10/2020 Cao ........................ G06N 20/00
2021/0003677 A1* 1/2021 Maksymova ........... H04L 69/04

OTHER PUBLICATIONS

Suhre and Malik: "Simulating Object Lists Using Neural Networks in Automotive Radar", 19th International Conference on Thermal, Mechanical and Multi-Physics Simulation and Experiments in Microelectronics and Microsystems (EuroSimE), (2018), pp. 1-5.
Wang, et al.: Synthetic Aperture Radar Image Generation With Deep Generative Models. In: IEEE Geoscience and Remote Sensing Letters, 16(6), (2019), pp. 912-916.

* cited by examiner

SYNTHETIC GENERATION OF RADAR, LIDAR AND ULTRASOUND MEASUREMENT DATA

CROSS REFERENCE

The present application claims the benefit under 35 U.S.C. § 119 of German Patent Application No. DE 102019216927.9 filed on Nov. 4, 2019, which is expressly incorporated herein by reference in its entirety.

FIELD

The present invention relates to the synthetic generation of measurement data, particularly for data that correspond to radar, LIDAR, ultrasound and similar physical measurement modalities.

BACKGROUND INFORMATION

In order to steer a vehicle through road traffic in an at least partially automated manner, it is necessary to capture physical measurement data from the surroundings of the vehicle and evaluate this data for other traffic participants, lane boundaries, or any other kind of object whose presence might make an alteration of the vehicle's trajectory necessary.

Capturing objects by radar is possible irrespective of illumination conditions. Also, radar data immediately yields the distance to objects and the speed of objects. This is vital information for assessing whether a vehicle might collide with a detected object.

When a machine learning module is to be trained to recognize objects based on radar measurements, the training data for the required training is a scarce resource. As it is described in the German Patent No. DE 10 2018 204 494 B3, when training data needs to be labelled by humans to perform supervised learning, this task is harder than it is for images because it is far less intuitive to recognize objects from radar signals. Also, because there are a lot of factors that influence the propagation of radar waves, object recognition based on radar data has a tendency to require more training data than object recognition based on optical images. German Patent No. DE 10 2018 204 494 B3 therefore proposes to generate synthetic radar data using a generative adversarial network, GAN.

SUMMARY

In accordance with an example embodiment of the present invention, a method is provided for generating synthetic measurement data that is indistinguishable from actual measurement data captured by a first physical imaging modality. This physical imaging modality is based on emitting an interrogating wave towards an object and recording a reflected wave coming from the object in a manner that allows for a determination of the time-of-flight between the emission of the interrogating beam and the arrival of the reflected wave. The interrogating wave may be transmitted, and the reflected wave may be received, in the form of a directional beam.

In particular, the interrogating wave may be a radar wave, a LIDAR wave, or an ultrasound wave. Specifically, the measurement data of the first physical measurement modality may comprise combinations of angles and distances to sites on the object that contribute to the emission of the reflected wave; and/or a point cloud of said sites on the object.

These measurement modalities have in common that the raw data is much more difficult to interpret by humans than image data. Therefore, when a machine learning model is trained to classify objects indicated by the measurement data or to obtain regression quantities such as the speed of objects, it is more expensive and time-consuming to label records of training data with the "ground truth" that is relevant for the task at hand. The possibility to obtain synthetic measurement data allows to make more training data available for the training of the machine learning module without requiring an overly high human effort for the labeling of this data.

The measurement data may be in any form that is appropriate for the intended use. For example, the measurement data may comprise time-series data or transforms of this time-series data into a frequency space, such as fast Fourier transforms.

In an example embodiment of the present invention, the method starts with obtaining a first compressed representation of the synthetic measurement data in a first latent space. This first latent space is associated with a first decoder that is trained to map each element of the first latent space to a record of synthetic measurement data that is indistinguishable from records of actual measurement data of the first physical measurement modality. For example, a tandem of an encoder and a decoder may be trained so that when a record of actual measurement data is transformed into the first compressed representation by the encoder and then transformed back to a record of synthetic measurement data, this record of synthetic measurement data best corresponds to the original record of actual measurement data. Even if such a training in tandem takes place, only the first decoder in its training state will be required for performing the method.

The trained first decoder is applied to the first compressed representation. This yields the sought synthetic measurement data.

In this manner, the rather complex task of obtaining synthetic measurement data may be reduced to the much simpler task of finding an appropriate compressed representation. Specifically, if the compression is a lossy one, the compressed representation may, in terms of the volume of the contained data, be 100 times or more smaller than the record of measurement data. It is a lot easier to find something in a space that has a dimensionality of 100 times less. The raw data generated by radar, LIDAR and ultrasonic sensors is sparse, i.e., contains much less information than could be represented by the respective signals. This allows lossy compression of the data without losing any crucial information about the sampled scene.

This effect is particularly pronounced if the first compressed representation comprises a vector or tensor of discrete variables and the number of these variables is less than the number of variables in a record of measurement data of the first physical measurement modality. For example, the first compressed representation may be a vector-quantized representation, i.e., a vector or tensor with quantized components. This narrows down the space in which the first compressed representation is to be sought further: since there is a finite number of dimensions and a finite number of possible discrete values along each dimension, there is a finite number of possible compressed representations.

The first compressed representation may be sought in the narrowed-down space using any suitable technique. For example, the variables in the compressed representation may be optimized using a parameter optimization technique in order to find a representation that maps to a suitable record of synthetic measurement data (i.e., a record that is indistinguishable from actual measurement data). In the vector-quantized case, even a brute-force search of the first latent space may be feasible if it can be tested sufficiently quickly whether a candidate compressed representation maps to a suitable record of synthetic measurement data.

Below, two exemplary methods of obtaining the first compressed representation are provided. These exemplary methods also take into account that the first latent space is usually a subspace of the complete vector space spanned by all the variables that the decoder takes as inputs. For example, if an encoder-decoder tandem is trained and the compressed representations produced by the encoder are vectors with 100 components, not all vectors from this 100-dimensional vector space will be decoded to a meaningful result. But the ability to find vectors that do map to suitable records of synthetic measurement data may be trained using further machine learning.

In a first exemplary embodiment, a sample is drawn from an input space of a prior transform that is trained to map each element of this input space to an element of the first latent space. The prior transform is then applied to this sample, and this yields the sought first compressed representation. This first compressed representation will then map to a suitable record of synthetic measurement data. In this manner, the overall task of obtaining the synthetic measurement data is split into two tasks that may be performed in sequence: training the encoder-decoder tandem to form the first latent space, and then training the prior-transform to convert samples (e.g., random samples) from an input space into samples that are members of the first latent space.

For example, the prior-transform may specifically comprise at least one trained autoregressive neural network. This neural network may, for example, be a convolutional neural network. One example of a prior-transform that may convert arbitrary input data to members of a latent space created by an encoder-decoder tandem is known in the art as "PixelCNN".

Preferably, the prior-transform may comprise multiple parts, such that different parts of the prior-transform map elements of their respective input spaces to respective outputs that are then superimposed to form the first compressed representation. For example, the different parts of the prior-transform may map their respective inputs to different portions of the first compressed representation, and all the portions together form the complete first compressed representation. This is particularly advantageous in a case where the first compressed representation is organized into a hierarchical structure of multiple levels. The different parts of the prior-transform may then be trained to produce different levels of the first compressed representation.

The advantage of splitting the prior-transform in this manner is two-fold.

First, there is more flexibility in attaching conditions to the sought synthetic measurement data. For example, the task at hand may be not to find just any synthetic radar image, but one that indicates the presence of certain objects. Such presence of certain objects may form the "class label" in a classification task. In an example where the first compressed representation comprises three levels (called a top, a medium and a bottom level), one first autoregressive neural network (e.g., PixelCNN) may be trained to find out each level of the compressed representation. The obtaining of the top level may be conditioned on the class label; the obtaining of the lower levels may be conditioned on both the class label and on the results of the preceding levels.

Second, because the parts of the prior-transform may be trained separately, this training may be parallelized. In this manner, all the available computing power and memory on hardware accelerators may be leveraged.

In a second exemplary embodiment, the method is configured specifically for domain transfer of measurement data. I.e., starting from actual measurement data of a second physical measurement modality, synthetic measurement data of the first physical measurement modality that represents a scene with a substantially similar content is sought.

For example, this second physical measurement modality may specifically comprise recording a spatially resolved distribution of the intensity and/or of the wavelength of light waves impinging on a sensor. Such a sensor yields images that may be easily interpreted by humans. It is therefore very common practice to obtain labels that represent the types of objects contained in images by outfarming the task to a large workforce of humans who mark the objects that they recognize in the images. There are also a lot of pre-existing collections of labelled images of this kind. If such a labelled image is domain-transferred to a synthetic record of radar data, then it is known from the start which objects the radar data will represent. In other words, any "ground-truth" labels attached to the image may be re-used for the radar data. This is a lot easier to accomplish than a human labelling of the radar data from scratch. Such a human labelling of radar data requires more expertise and more time than a human labelling of images.

To accomplish the domain transfer, a second trained encoder is applied to a record of actual measurement data of the second physical measurement modality that is different from the first physical measurement modality. For example, this record may comprise an image.

Applying the second trained encoder yields a second compressed representation of the second actual measurement data (e.g., image) in a second latent space. In analogy to the first latent space, this second latent space is associated with a second decoder that is trained to map each element of the second latent space to a record of synthetic measurement data of the second measurement modality that is indistinguishable from records of actual measurement data of this second physical measurement modality. For example, the second encoder and the second decoder may be trained in an encoder-decoder tandem, so that an input record of actual measurement data of the second modality (e.g., an image), when encoded to a compressed representation by the encoder and subsequently decoded by the decoder, is best reproduced. Even if the second encoder and the second decoder are trained in a tandem in this manner, in the course of the method, only the second encoder is needed in its trained state.

A domain transform is applied to the second compressed representation. This domain transform is trained to map each element of the second latent space to an element of the first latent space. In this manner, the sought first compressed representation is obtained. The first decoder may then be applied to this first compressed representation to obtain the final result, namely the sought synthetic measurement data of the first physical measurement modality.

Similarly to the first embodiment, the task of the domain transfer is split up into the generation of the second compressed representation on the one hand and the actual transfer of this second compressed representation to the first latent space on the other hand. Training for both tasks may again be performed in sequence and is thus easier to accomplish than one single training for a monolithic mapping that directly leads from the record of actual measurement data of the second modality to the first compressed representation in the first latent space. A real-world analogy here is that it is much easier to jump from the ground 1 m high to a first step and from there 1 m higher to a next step than it is to jump 2 m high in one go.

No matter whether the task is to obtain the synthetic measurement data "from scratch" (e.g., based on an arbitrary sample drawn at random from an input space) or by domain transfer from another measurement modality, in a further particularly advantageous embodiment, the first latent space from which to obtain the first compressed representation may be chosen such that the synthetic measurement data to which the first decoder maps elements of this first latent space are consistent with at least one predetermined condition. As discussed before, this predetermined condition may comprise some sort of class label, so that synthetic measurement data belonging to specific classes of a classification may be obtained. For example, radar data that shows two vehicles on a collision course and a stop sign may be specifically requested.

Preferably, the predetermined condition specifically comprises interaction of the interrogating wave with one or more specific objects, and/or one or more environmental conditions that affect the propagation of the interrogating wave, and/or of the reflected wave. For example, because the microwave radiation used for radar imaging is partially absorbed by water, radar data of one and the same scene may change when heavy rain sets in. An object detection system for a vehicle is supposed to work reliably in all sorts of environmental conditions, so training data with a certain variability as to these environmental conditions is required.

By appropriately setting the predetermined condition, the method may be used to obtain training data that represent all sorts of conditions and combinations even though not all such combinations have been part of the training on any used encoders, decoders, prior-transforms and domain-transforms. For example, such training may have been based on radar data of various types of vehicles and various types of weather conditions, but there may be no data of a Lamborghini in heavy snowfall because no sane owner of such an expensive car will risk an accident in adverse wintery driving conditions. With the method described above, this radar data may be synthetically generated, augmenting the data pool that may be used for the training of a machine learning module for object detection.

Thus, in a further particularly advantageous embodiment of the present invention, the method may further comprise training, using the generated synthetic measurement data of the first physical measurement modality, at least one machine learning module. This machine learning module is to map actual measurement data captured from a vehicle to at least one classification and/or regression value. This classification and/or regression value is relevant for operating the vehicle in road traffic in an at least partially automated manner. In particular, the generated synthetic measurement data may be used to augment an already existing set of actual measurement data of the first physical measurement modality, so that the final data set used for the training has the desired variability with respect to the different situations and conditions.

As discussed above, classes of a classification may pertain to types of objects. In particular, the measurement data acquired from the vehicle may be "semantically segmented" into contributions from different objects. Regression values may, for example, comprise speeds and directions of objects, friction coefficients between tires and the road, or the maximum range ahead of the vehicle in the direction of travel that can be surveyed by the vehicle's sensors under the present conditions.

After it has been trained in this manner, the machine learning module may be put to use in a vehicle. Therefore, in a further particularly advantageous embodiment, the method further comprises:

acquiring, from a vehicle, actual measurement data using the first physical measurement modality;

processing, by the trained machine learning module, the acquired actual measurement data to obtain at least one classification and/or regression value;

computing, from the classification and/or regression value, at least one actuation signal for at least one system of the vehicle; and actuating the system with said actuation signal.

For example, upon determining that the presently envisaged trajectory of the vehicle in space and time intersects the trajectory of another vehicle that is in the way, a steering system and/or a braking system may be actuated to slow down the vehicle to a stop before reaching the other vehicle, or to go on a path around the other vehicle. In the context of this and other safety critical applications, the possibility to generate synthetic measurement data allows to augment the training data used for the training of the machine learning module, improving the variability of this training data. This improves the result of the training, and thus also the probability that the machine learning module will cause the vehicle to perform the correct action in a given particular traffic situation.

As discussed above, the first decoder in its trained state may be obtained based on unlabeled actual measurement data using a training in the style of a variational autoencoder. The invention therefore also relates to a method for training a first encoder and decoder. The method comprises the steps of:

obtaining a set of records of actual measurement data by the first physical measurement modality;

mapping each record of the actual measurement data to a first compressed representation by means of a first trainable encoder;

mapping the first compressed representation to a record of synthetic measurement data of the first physical measurement modality by means of a first trainable decoder; and optimizing parameters that characterize the behavior of the first encoder and decoder with the goal of minimizing a difference between records of synthetic measurement data and corresponding records of actual measurement data.

Herein, as discussed above, this first physical measurement modality is based on emitting an interrogating wave towards an object and recording a reflected wave coming from the object in a manner that allows for a determination of the time-of-flight between the emission of the interrogating beam and the arrival of the reflected wave. The interrogating wave is a radar wave, a LIDAR wave or an ultrasound wave.

As discussed above, the training of the first decoder is independent from the training of any further means, such as a prior-transform or a domain-transform, that is used to obtain a first compressed representation. This means that if the prior-transform is to be changed to one that maps between a new desired input space and the first latent space, the training of the first decoder still remains valid and does not have to be repeated. Likewise, if it is desired to perform domain transfer from a new physical measurement modality to the first physical measurement modality, a new domain-transform will have to be trained, but no change of the first decoder will be necessary.

The present invention also provides a method for training a domain-transform that can be used to map second compressed representations of actual measurement data of the second physical measurement modality to the first latent space.

In the course of this example method, a set of records of actual measurement data is obtained by the second physical measurement modality. Each record of this actual measurement data is mapped to a second compressed representation by means of a second trained encoder which, as discussed before, may be trained in tandem with a second decoder in the style of a variational autoencoder.

The second compressed representation is mapped to a first compressed representation by the trainable domain-transform. The first compressed representation is mapped to a record of synthetic measurement data by means of the first trained decoder. Parameters that characterize the behavior of the domain-transform are optimized with the goal of making records of synthetic measurement data indistinguishable from records that result from processing actual measurement data of the first physical measurement modality into a compressed representation using the first trained encoder and passing this compressed representation on to the first trained decoder.

In other words, the optimality criterion for the optimization of the parameters that characterize the behavior of the domain-transform measures how well the finally obtained record synthetic measurement data "blends in" among records that have been generated from known members of the first latent space, namely first compressed representations that have been generated from actual measurement data of the first physical measurement modality by means of the first encoder corresponding to the first decoder.

In either training method, the parameters may, for example, comprise weights with which the inputs to a neuron or other processing unit in a neural network are aggregated to form an activation of this neuron or other processing unit. Optimization of the parameters may proceed according to any suitable method. For example, a gradient descent method may be used.

All the example methods described above may be at least in part computer-implemented. The present invention therefore also relates to a computer program with machine-readable instructions that, when executed by one or more computers, cause the one or more computers to perform at least one of the methods described above. In this respect, electronic control units for vehicles or subsystems of vehicles, and other embedded systems that control technical devices based on programmable instructions, shall be comprised in the meaning of the term "computer".

The computer program may be embodied in a non-transitory machine-readable storage medium, and/or in a download product. A download product is a digital deliverable that may be traded and purchased online, so that it may be delivered to a computer immediately without having to ship a non-transitory storage medium.

Alternatively or in combination, the storage medium, and/or the download product, may contain synthetic measurement data produced by the method as described above.

As discussed above, whoever has this synthetic measurement data may immediately start augmenting the training of a machine learning module.

Alternatively or in combination, the storage medium, and/or the download product, may contain parameters that characterize the behavior of a first encoder and decoder and that where produced by the training method for such encoder and decoder. Whoever has these parameters may immediately start using the first encoder and first decoder without having to train it.

Alternatively or in combination, the storage medium, and/or the download product, may contain parameters that characterize the behavior of a domain-transform and that where produced by the training method for such domain-transform. Whoever has these parameters may immediately start using the domain-transform without having to train it.

The present invention also relates to a computer that is provisioned with the computer program, and/or with the machine-readable storage medium and/or download product.

Further advantageous embodiments are now detailed using Figures without any intention to limit the scope of the present invention.

DETAILED DESCRIPTION OF EXAMPLE EMBODIMENTS

Figure 1:
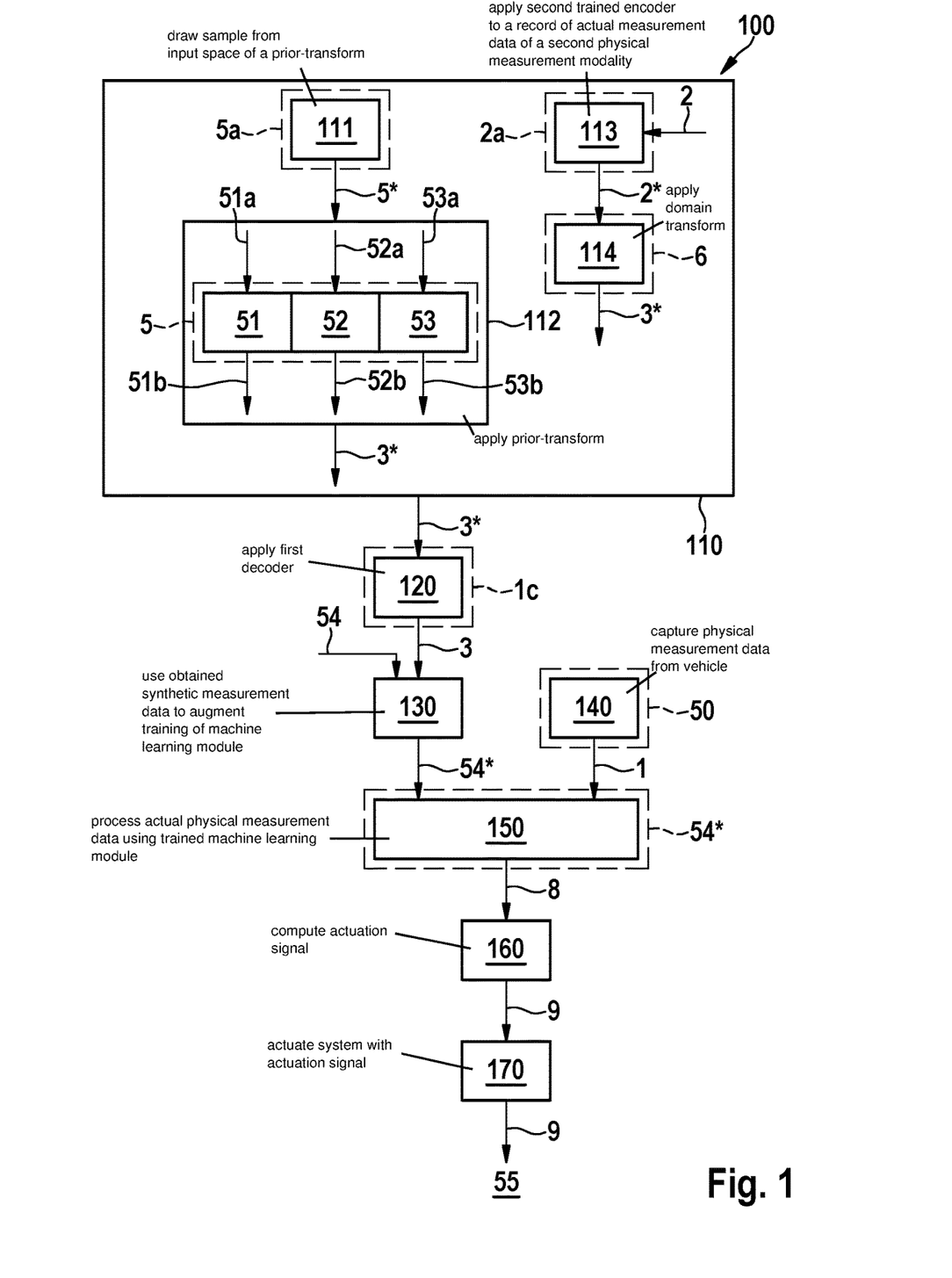
FIG. 1 shows an exemplary embodiment of the method 100 for generating synthetic measurement data 3 in accordance with the present invention.
Figure 2:
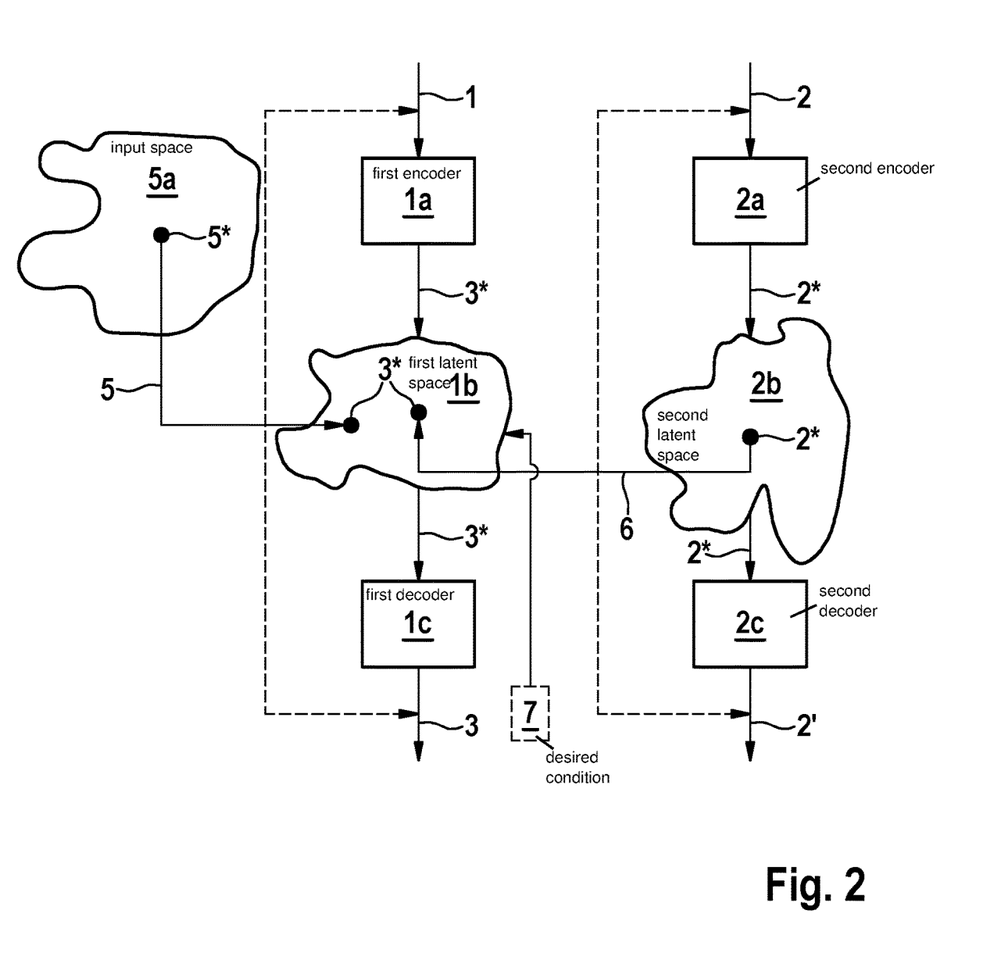
FIG. 2 shows a schematic overview of the involved spaces and transforms that are used in the course of the method 100 in accordance with an example embodiment of the present invention.
Figure 3:
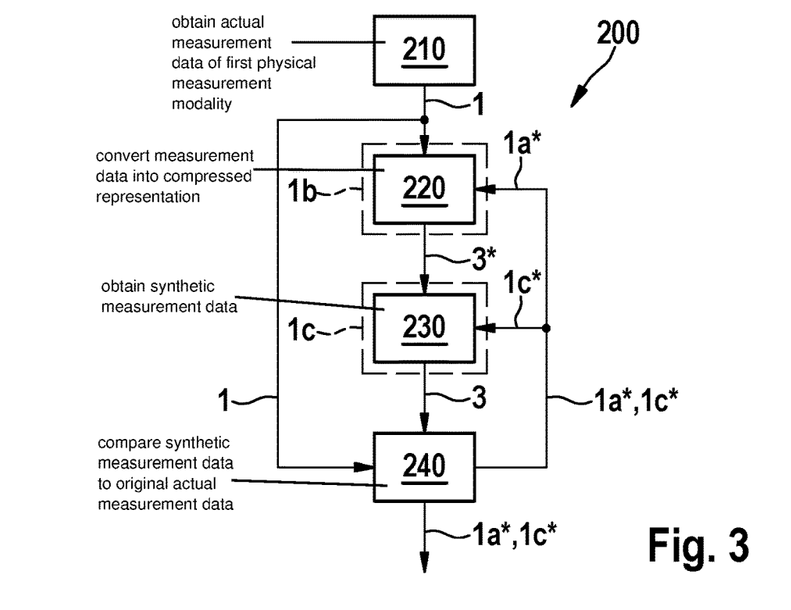
FIG. 3 shows an exemplary embodiment of a method 200 for training a first encoder 1a and a first decoder 1c in accordance with the present invention.

FIG. 1 is a flow chart of an exemplary embodiment of the method 100. In step 110, a first compressed representation 3* of the synthetic measurement data in a first latent space 1b is obtained. This first latent space 1b is associated with a first decoder 1c that may be trained in tandem with a first encoder 1a, as it is illustrated in FIGS. 2 and 3. In step 120, the first decoder 1c is applied to the first compressed representation 3*, so that the sought synthetic measurement data is obtained.

Inside box 110, two exemplary ways of obtaining the first compressed representation 3* are illustrated.

According to block 111, a sample 5* may be drawn from an input space 5a of a prior-transform 5. This prior-transform 5 is trained to map each element of the input space 5a to an element of the first latent space 1b. Therefore, when this mapping is performed according to block 112, the sought first compressed representation 3* results.

In the example shown in FIG. 1, the prior-transform 5 comprises multiple parts 51-53. Each of these multiple parts 51-53 has its own input space 51a-53a and outputs a contribution 51b-53b. The contributions 51b-53b are aggregated to form the compressed representation 3*.

According to block 113, a second trained encoder 2a may be applied to a record of actual measurement data 2 of a second physical measurement modality. This yields a second compressed representation 2* of this actual physical measurement data. According to block 114, a domain transform 6 may be applied to this compressed representation 2* to obtain the first compressed representation 3* in the first latent space 1b.

In FIG. 1, additionally, uses to which the obtained synthetic measurement data 3 may be put are illustrated. In step 130, these synthetic measurement data 3 may be used to augment the training of a machine learning module 54, so as to obtain its trained state 54*. The trained machine learning module 54* in turn may be used in step 150 to process actual physical measurement data 1 that has been captured from a vehicle 50 in step 140.

The processing in step 150 yields at least one classification and/or regression value 8 that is relevant for operation of the vehicle 50 in traffic. From this classification and/or regression value 8, in step 160, at least one actuation signal 9 for a system 55 of the vehicle 50 is computed. In step 170, the system 55 is actuated with this actuation signal 9.

FIG. 2 illustrates the involved transforms and spaces. From actual measurement data 1 of the first physical measurement modality, the first encoder 1a produces a compressed representation 3* that resides in a latent space 1b. A first decoder 1b is trained to map each compressed representation 3* to a record of synthetic measurement data 3 of the first physical measurement modality. That is, the compressed representation 3* is also a representation of the record of synthetic measurement data 3. The first encoder 1a and the first decoder 1b may be trained in tandem, with the optimization goal that the synthetic measurement data 3 ultimately obtained from a given record of actual measurement data 1 shall best match this original measurement data 1. This optimization goal, indicated by a dashed line, renders the synthetic measurement data 3 indistinguishable from actual measurement data 1.

Likewise, for the second physical measurement modality that is different from the first one, there is a second encoder 2a that maps actual measurement data 2 of this second modality to a compressed representation 2* that resides in a second latent space 2b. A second decoder 2c maps the compressed representations 2* to records of synthetic measurement data 2' of the second measurement modality. The second encoder 2a and the second decoder 2b may be trained in tandem, with the optimization goal that synthetic measurement data 2' ultimately obtained from a given record of actual measurement data 2 shall best match this original actual measurement data 2. This optimization goal, indicated by a dashed line, renders the synthetic measurement data 2' indistinguishable from actual measurement data 2.

One way to obtain synthetic measurement data 3 of the first physical measurement modality is to draw a sample 5* from the input space 5a of the prior-transform 5, and apply this prior-transform 5 to arrive at a compressed representation 3* that may then be converted to the sought synthetic measurement data 3 by the first decoder 1c.

Another way to obtain synthetic measurement data 3 is domain transfer from the second physical measurement modality. From actual measurement data 2 of this second modality, the second encoder 2a produces a compressed representation 2*. The trained domain-transform 6 transforms this compressed representation 2* from the second latent space 2b into a compressed representation 3* in the first latent space 1b that may again be converted to the sought synthetic measurement data 3 by the first decoder 1c.

The first latent space 1b may be specifically chosen such that the synthetic measurement data 3 obtained from its members by the first decoder 1c fulfil a desired condition 7.

FIG. 3 is a flow chart of an exemplary embodiment of the method 200 for training the first encoder 1a and the first decoder 1c in tandem. In step 210, actual measurement data 1 of the first physical measurement modality is obtained. In step 220, this measurement data 1 is converted into a compressed representation 3*. From this compressed representation 3*, synthetic measurement data 3 is obtained in step 230. This synthetic measurement data 3 is compared to the original actual measurement data 1 in step 240, and parameters 1a*, 1c* that characterize the behavior of the first encoder 1a and the first decoder 1c are optimized for a best match between the synthetic data 3 and the original data 1.

Figure 4:
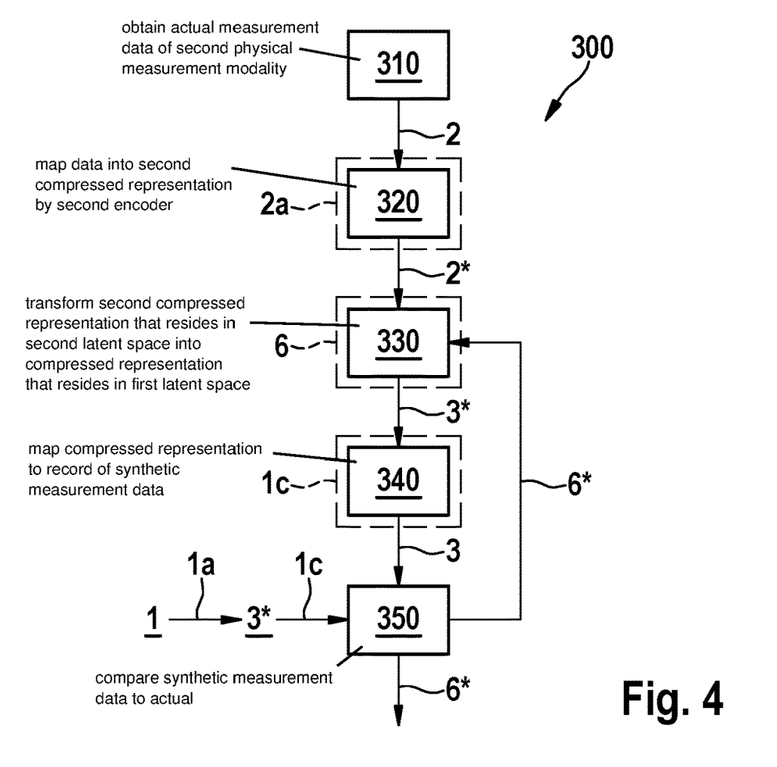
FIG. 4 shows an exemplary embodiment of a method 300 for training a domain transform 6 in accordance with an example embodiment of the present invention.

FIG. 4 is a flow chart of an exemplary embodiment of the method 300 for training the domain-transform 6. In step 310, actual measurement data 2 of the second physical measurement modality is obtained. In step 320, this data 2 is mapped into a second compressed representation by the second encoder 2a, which is already in its trained state. In step 330, the compressed representation 2* that resides in the second latent space 2b is transformed into a compressed representation 3* that resides in the first latent space 1b by the to-be-trained domain-transform 6. In step 340, the compressed representation 3* is mapped to a record of synthetic measurement data 3 by the first decoder 1c, which is already in its trained state. In step 350, this synthetic measurement data 3 is compared to the result that is obtained when actual physical measurement data 1 of the first physical measurement modality is first transformed into a compressed representation 3* by the first decoder 1a that is already in its trained state and then transformed back to synthetic measurement data 3. Parameters 6* that characterize the behavior of the domain-transform 6 are optimized so that an optimum match between the synthetic measurement data 3 generated via the domain-transform 6 from the actual measurement data 2 of the second physical measurement modality and the synthetic measurement data 3 generated from the actual measurement data 1 of the first physical measurement modality results.

What is claimed is:

1. A method for generating synthetic measurement data that is indistinguishable from actual measurement data captured by a first physical measurement modality, the first physical measurement modality being based on emitting an interrogating wave towards an object and recording a reflected wave coming from the object in a manner that allows for a determination of a time-of-flight between the emission of the interrogating beam and arrival of the reflected wave, the method comprising the following steps:

obtaining a first compressed representation of the synthetic measurement data in a first latent space, wherein the first latent space is associated with a first decoder that is trained to map each element of the first latent space to a record of synthetic measurement data that is indistinguishable from records of actual measurement data of the first physical measurement modality;

applying the first decoder to the first compressed representation, so as to obtain the synthetic measurement data; and training, using the generated synthetic measurement data, at least one machine learning module that is to map actual measurement data captured from a vehicle to at least one classification and/or regression value, wherein the classification and/or regression value is used for operating the vehicle in road traffic in an at least partially automated manner;
wherein the obtaining of the first compressed representation includes:
applying a second trained encoder to a record of actual measurement data of a second physical measurement modality that is different from the first physical measurement modality, so as to obtain a second compressed representation of the actual measurement data of the second physical measurement modality in a second latent space, wherein the second latent space is associated with a second decoder that is trained to map each element of the second latent space to a record of synthetic measurement data that is indistinguishable from records of actual measurement data of the second physical measurement modality, and
applying a domain-transform, which is trained to map each element of the second latent space to an element of the first latent space, to the second compressed representation, so as to obtain the first compressed representation.

2. The method of claim 1, wherein the obtaining of the first compressed representation includes:
drawing a sample from an input space of a prior-transform that is trained to map each element of the input space to an element of the first latent space; and
applying the prior-transform to the sample, so as to obtain the first compressed representation.

3. The method of claim 2, wherein the prior-transform includes at least one trained autoregressive neural network.

4. The method of claim 2, wherein the prior-transform includes multiple parts, such that different ones of the parts of the prior-transform map elements of their respective input spaces to respective outputs that are then superimposed to form the first compressed representation.

5. The method of claim 1, wherein the second physical measurement modality includes recording a spatially resolved distribution of intensity and/or of wavelength of light waves impinging on a sensor.

6. The method of claim 1, wherein the first compressed representation includes a vector or tensor of discrete variables, wherein a number of the discrete variables is less than a number of variables in a record of measurement data of the first physical measurement modality.

7. The method of claim 1, wherein the obtaining of the first compressed representation includes:
choosing the first latent space from which to obtain the first compressed representation such that the synthetic measurement data to which the first decoder maps elements of the first latent space are consistent with at least one predetermined condition.

8. The method of claim 7, wherein the predetermined condition includes: interaction of the interrogating wave with one or more specific objects, and/or one or more environmental conditions that affect propagation of the interrogating wave, and/or of the reflected wave.

9. The method of claim 1, further comprising the following steps:
acquiring, from a vehicle, actual measurement data using the first physical measurement modality;
processing, by the trained machine learning module, the acquired actual measurement data to obtain at least one classification and/or regression value;
computing, from the classification and/or regression value, at least one actuation signal for at least one system of the vehicle; and
actuating the system with the actuation signal.

10. The method of claim 1, wherein the interrogating wave of the first physical measurement modality is a radar wave or a LIDAR wave or an ultrasound wave.

11. The method of claim 10, wherein measurement data of the first physical measurement modality include:
combinations of angles and distances to sites on the object that contribute to the emission of the reflected wave; and/or
a point cloud of the sites on the object.

12. A non-transitory machine-readable storage medium on which is stored computer program for generating synthetic measurement data that is indistinguishable from actual measurement data captured by a first physical measurement modality, the first physical measurement modality being based on emitting an interrogating wave towards an object and recording a reflected wave coming from the object in a manner that allows for a determination of a time-of-flight between the emission of the interrogating beam and arrival of the reflected wave, the computer program, when executed by a computer, causing the computer to perform the following steps:
obtaining a first compressed representation of the synthetic measurement data in a first latent space, wherein the first latent space is associated with a first decoder that is trained to map each element of the first latent space to a record of synthetic measurement data that is indistinguishable from records of actual measurement data of the first physical measurement modality;
applying the first decoder to the first compressed representation, so as to obtain the synthetic measurement data; and
training, using the generated synthetic measurement data, at least one machine learning module that is to map actual measurement data captured from a vehicle to at least one classification and/or regression value, wherein the classification and/or regression value is used for operating the vehicle in road traffic in an at least partially automated manner;
wherein the obtaining of the first compressed representation includes:
applying a second trained encoder to a record of actual measurement data of a second physical measurement modality that is different from the first physical measurement modality, so as to obtain a second compressed representation of the actual measurement data of the second physical measurement modality in a second latent space, wherein the second latent space is associated with a second decoder that is trained to map each element of the second latent space to a record of synthetic measurement data that is indistinguishable from records of actual measurement data of the second physical measurement modality, and
applying a domain-transform, which is trained to map each element of the second latent space to an element of the first latent space, to the second compressed representation, so as to obtain the first compressed representation.

13. A computer configured to generate synthetic measurement data that is indistinguishable from actual measurement data captured by a first physical measurement modality, the first physical measurement modality being based on emitting an interrogating wave towards an object and recording a reflected wave coming from the object in a manner that allows for a determination of a time-of-flight between the emission of the interrogating beam and arrival of the reflected wave, the computer configured to:
- obtain a first compressed representation of the synthetic measurement data in a first latent space, wherein the first latent space is associated with a first decoder that is trained to map each element of the first latent space to a record of synthetic measurement data that is indistinguishable from records of actual measurement data of the first physical measurement modality;
- apply the first decoder to the first compressed representation, so as to obtain the synthetic measurement data; and
- train, using the generated synthetic measurement data, at least one machine learning module that is to map actual measurement data captured from a vehicle to at least one classification and/or regression value, wherein the classification and/or regression value is used for operating the vehicle in road traffic in an at least partially automated manner;
- wherein the obtaining of the first compressed representation includes:
  - applying a second trained encoder to a record of actual measurement data of a second physical measurement modality that is different from the first physical measurement modality, so as to obtain a second compressed representation of the actual measurement data of the second physical measurement modality in a second latent space, wherein the second latent space is associated with a second decoder that is trained to map each element of the second latent space to a record of synthetic measurement data that is indistinguishable from records of actual measurement data of the second physical measurement modality, and
  - applying a domain-transform, which is trained to map each element of the second latent space to an element of the first latent space, to the second compressed representation, so as to obtain the first compressed representation.

* * * * *